United States Patent

Bertetti et al.

[11] Patent Number: 5,782,565
[45] Date of Patent: Jul. 21, 1998

[54] BALL BEARING FOR AN AUTOMOBILE WHEEL HUB

[75] Inventors: Paolo Bertetti; Mauro Picca, both of Turin, Italy

[73] Assignee: SKF Industrie S.p.A., Turin, Italy

[21] Appl. No.: 627,057

[22] Filed: Apr. 3, 1996

[30] Foreign Application Priority Data

Apr. 6, 1995 [IT] Italy ................ TO950084 U

[51] Int. Cl.$^6$ .............. F16C 43/04; F16C 33/60
[52] U.S. Cl. ............... 384/537; 384/544; 384/448
[58] Field of Search ................. 384/504, 512, 384/537, 543, 544, 448

[56] References Cited

U.S. PATENT DOCUMENTS

| | | | |
|---|---|---|---|
| 3,583,511 | 6/1971 | Asberg | 384/544 X |
| 5,226,738 | 7/1993 | Valette et al. | 384/537 X |
| 5,240,333 | 8/1993 | Hassiotis et al. | 384/537 X |
| 5,490,732 | 2/1996 | Hofmann et al. | 384/537 |

FOREIGN PATENT DOCUMENTS

| | | | |
|---|---|---|---|
| 323159 | 7/1989 | European Pat. Off. | 384/448 |
| 838237 | 5/1952 | Germany | 384/448 |

*Primary Examiner*—Thomas R. Hannon
*Attorney, Agent, or Firm*—Bachman & LaPointe, P.C.

[57] ABSTRACT

In a ball bearing for an automobile wheel hub comprising a double set of balls, the inner race is composed of two half-races to allow mounting of one of the two sets of balls. A first set of balls (2) is located between an outer race (3) and a facing portion of the hub (4). A second set of balls (5) is located between the outer race (3) and an inner half-race (6) fixed onto the hub (4). The inner half-race (6) is secured by an ring-like end portion (9) of the hub (4) folded by cold forming. A substantially flat washer (10) is interposed between said inner half-race (6) and the ring-like end portion (9).

8 Claims, 1 Drawing Sheet

BALL BEARING FOR AN AUTOMOBILE WHEEL HUB

DESCRIPTION

1. Field of the Invention

The present invention refers to a ball bearing for an automobile wheel hub, of the type comprising a double set of balls in angular contact, the inner race being composed of two half-races to allow mounting of one of the two sets of balls.

2. Description of Prior Art

There are known various methods of locking together the two inner races of a ball bearing or, generally, two metal rings slipped or screwed one on the other, wherein one abuts the other. Among these methods, the most common is that of using a bolt inserted axially in one of the two races, the head of the bolt urging axially against a side face of the other race. This method, although being very simple, implies a number of operations which render it expensive. Moreover, it only allows a slight reduction of the inner diameter of the inner race and, consequently, of the overall weight and dimensions of the bearing. The reason of this is that it is impossible to narrow the wall in which the tread for the bolt is provided over a certain extent, otherwise it would easily collapse. A second method, disclosed in U.S. Pat. No. 5,240,333, consists in cold forming a first inner half race so as to create a front wall for abutting the outer face of the second outer half race. This method, besides allowing to reduce the number of operations required and therefore production costs, it does not allow to reduce the overall diameter of the inner race. In fact, the cold forming process generates strain within the second half-race which are likely to deform the race on which the balls roll. It is therefore necessary that such second half-race has a relatively high thickness in order to prevent said deformation from occurring. As a consequence, the overall diameter remains of considerable dimensions with no chances of reducing it, also because the machine carrying out cold forming requires an axial bore in the first half race which cannot be reduced in its diameter below a certain level.

In an embodiment illustrated in U.S. Pat. No. 3,583,511, forming concerns an inner half race for a wheel hub bearing, in which the other half-race inserted thereon is kept in position by a threaded flange. Forming of the inner half race is in this case intended for guaranteeing positioning of the second half-race, which is attained by providing said threaded flange. Forming in this instance concerns only a minimum portion of the inner half race and does not generate strains therein which could cause deformation of the ball races.

However, the number of working operations remains high and in addition it is a particular application making use of a flange that has no general use.

U.S. Pat. No. 5,226,738 discloses the application of a tapered ring for axial support axially interposed between one of the half-races and a collar obtained by folding the end portion of the hub. Said tapered ring is heated before mounting to the bearing. As it cools, the ring contracts radially. Radial contraction of the tapered section transmits an axial load to the bearing.

SUMMARY OF THE INVENTION

It is an object of the present invention to provide a wheel hub ball bearing which on one hand allows to reduce the number of operations and assembly costs and on the other hand provides for considerably reduction of the overall diameter of the bearing without jeopardizing its reliability.

The above and further objects which will be more apparent hereinafter are attained according to the present invention by the provision of a ball bearing for an automobile wheel hub, of the type comprising a double set of balls in angular contact, the inner race being composed of two half-races to allow mounting of one of the two sets of balls, of which the first set of balls is located between an outer race and a facing portion of the hub, and the second set of balls is located between the outer race and an inner half-race fixed onto said hub, said inner half-race being secured by an ring-like end portion of said hub folded by cold forming, characterized in that a substantially flat washer is interposed between said inner half-race and said ring-like end portion.

BRIEF DESCRIPTION OF THE DRAWINGS

For a better understanding of the present invention, reference is made to the following detailed description of various exemplary embodiments considered in combination with the accompanying drawings in which.

DESCRIPTION OF PREFERRED EMBODIMENTS

Figure 1:
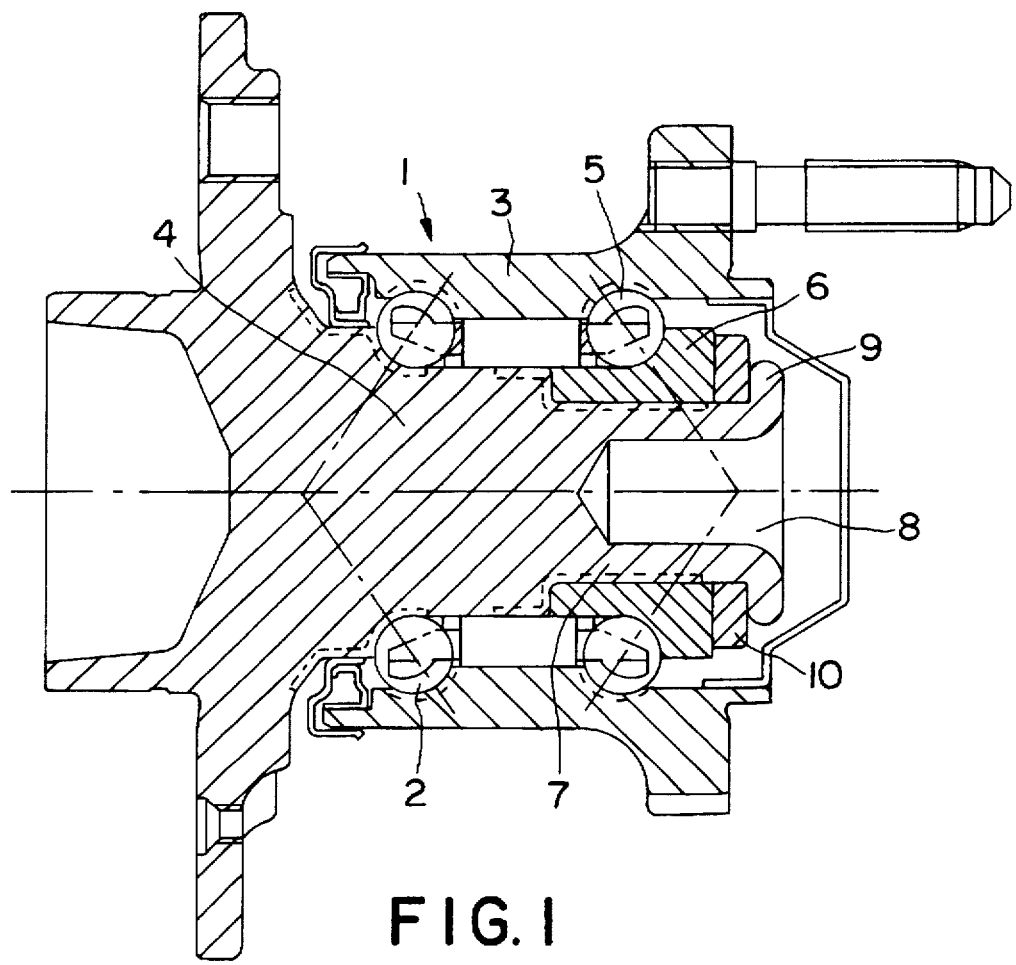
FIG. 1 is a partial axial sectional view of a bearing arranged in accordance with the present invention.

With reference to FIG. 1, numeral 1 designates overall a ball bearing for an automobile wheel hub, of the type with a double set of balls.

The race of the first set of balls 2 is formed in the outer ring 3 and the portion of hub 4 being part of the inner race of the bearing. The outer race 3 also contains the race for the second set of balls 5. These balls roll on a separate inner ring 6 which is interference fitted on the protruding portion 7 of hub 4. Protruding portion 7 provides an axial bore 8. Due to this arrangement, the bearing surely has to resist high axial forces, whereby the separate ring 6 must be securely fixed to protruding portion 7 of hub 4. Fixing is attained by cold forming of the end ring 9 of protruding portion 7. It is achieved by inserting a tool in axial bore 8.

In order to avoid cracks in ring 9 while performing cold forming, and especially to prevent race 6 from undergoing deformations which could jeopardize correct operation of the bearing and shorten its lifetime, according to the present invention a substantially flat washer 10 is fitted with slight interference on protruding portion 7 of hub 4 and against the outer face of said race 6. The outer race 3 extends over the inner half-race 6 and the washer 10 as is clearly shown in FIG. 1. Washer 10, which is preferably made of a less harder material than that of race 6, is so sandwiched between race 6 and the folded portion of end ring 9 after cold forming. In this way, most of axial and radial thrusts due to cold forming are absorbed by the washer without prejudice to race 6 on which the balls roll. Race 6 can therefore be suitably sized so as to reduce overall diameter of the bearing with appreciable advantages.

This is made possible because the thickness of race 6 is considerably less than what could be achieved without employing washer 10. Preferably, the radial width "w" will be greater that its axial thickness "t". More preferably, the W/T ratio will be of about 2:1. The radial width (w) of washer 10 is less than the radial width (w) of inner half-race 6 as is clearly evident from FIG. 1.

The same results will obviously be attained also where the race for the first set of balls consists of a separate ring not being obtained integral from hub 4.

Figure 2:
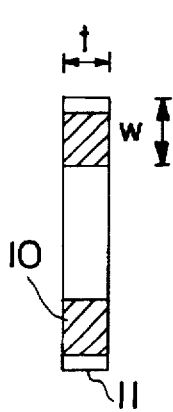
FIGS. 2 to 4 show alternative embodiments of a washer that this invention proposes to use.
Figure 3:
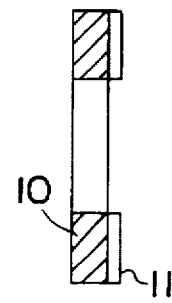
Figure 4:
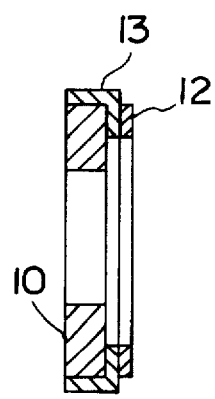

Still according to the present invention, an axial or radial toothing can be provided on washer 10 in order to act as an impulse ring for a revolving speed gauging device. For example, as illustrated in FIG. 2, the axial toothing 11 is provided on the peripheral part of the washer 10. In the embodiment of FIG. 3, a radial toothing 11 is provided. In a still different embodiment, schematically shown in FIG. 4, a magnetized ring 12 is applied to the peripheral part of washer 10 through a mounting metal insert 13.

We claim:

1. A ball bearing for an automobile wheel hub, of the type comprising a double set of balls in angular contact, the inner race being composed of two half-races to allow mounting of one of the two sets of balls, of which the first set of balls (2) is located between an outer race (3) and a facing portion of the hub (4), and the second set of balls (5) is located between the outer race (3) and an inner half-race (6) fixed onto said hub (4), said inner half-race (6) being secured by a ring-like end portion (9) of said hub (4) folded by cold forming, characterized in that a substantially flat washer (10) is interposed between said inner-race (6) and said ring-like end portion (9) and said washer (10) is of a less harder material than that of said inner half-race (6).

2. A ball bearing for an automobile wheel hub as claimed in claim 1, characterized in that the washer (10) is so shaped as to act as an impulse ring for a rotating speed sensing device.

3. A ball bearing for an automobile wheel hub as claimed in claim 2, characterized in that said washer has an axially or radially directed toothed peripheral portion.

4. A ball bearing for an automobile wheel hub as claimed in claim 2, characterized in that a magnetized ring (12) is applied to the peripheral part of said washer (10) through a mounting metal insert (13).

5. A ball bearing for an automobile wheel hub as claimed in claim 1, characterized in that the radial width (w) of said washer (10) is greater that its axial thickness (t).

6. A ball bearing for an automobile wheel hub as claimed in claim 5, characterized in that w/t ratio is of about 2:1.

7. A ball bearing for an automobile wheel hub as claimed in claim 1, characterized in that the outer race (3) extends over the inner half-race (6) and the washer (10).

8. A ball bearing for an automobile wheel hub as claimed in claim 7, characterized in that the radial width (w) of washer (10) is less than the radial width (w) of inner half-race (6).

* * * * *